US009355234B1

(12) United States Patent
Magi Shaashua et al.

(10) Patent No.: US 9,355,234 B1
(45) Date of Patent: May 31, 2016

(54) AUTHENTICATION INVOLVING SELECTION AMONG DIFFERENT BIOMETRIC METHODS DYNAMICALLY

(71) Applicant: EMC Corporation, Hopkinton, MA (US)

(72) Inventors: Triinu Magi Shaashua, Herzeliya (IL); Alon Kaufman, Bnei-Dror (IL); Yael Villa, Tel Aviv (IL)

(73) Assignee: EMC Corporation, Hopkinton, MA (US)

(*) Notice: Subject to any disclaimer, the term of this patent is extended or adjusted under 35 U.S.C. 154(b) by 140 days.

(21) Appl. No.: 14/039,868

(22) Filed: Sep. 27, 2013

(51) Int. Cl.
*H04L 29/06* (2006.01)
*G06F 21/32* (2013.01)
*H04L 29/08* (2006.01)
*H04L 12/58* (2006.01)

(52) U.S. Cl.
CPC ................ *G06F 21/32* (2013.01); *H04L 51/32* (2013.01); *H04L 63/0861* (2013.01); *H04L 67/22* (2013.01)

(58) Field of Classification Search
CPC ..... H04L 63/0861; H04L 67/22; H04L 51/32; G06F 21/32
See application file for complete search history.

(56) References Cited

U.S. PATENT DOCUMENTS

| | | | | |
|---|---|---|---|---|
| 6,038,334 | A * | 3/2000 | Hamid | 382/124 |
| 8,752,144 | B1 | 6/2014 | Kaufman et al. | |
| 8,886,316 | B1 | 11/2014 | Juels | |
| 8,925,058 | B1 * | 12/2014 | Dotan et al. | 726/7 |
| 2002/0091937 | A1 * | 7/2002 | Ortiz | 713/200 |
| 2002/0093425 | A1 * | 7/2002 | Puchek et al. | 340/540 |
| 2006/0110011 | A1 * | 5/2006 | Cohen et al. | 382/115 |
| 2006/0166716 | A1 * | 7/2006 | Seshadri et al. | 455/575.2 |
| 2007/0241861 | A1 * | 10/2007 | Venkatanna et al. | 340/5.52 |
| 2010/0121644 | A1 * | 5/2010 | Glasser | 704/273 |
| 2012/0297464 | A1 * | 11/2012 | Busch et al. | 726/5 |
| 2015/0030212 | A1 * | 1/2015 | Cavanagh et al. | 382/115 |

* cited by examiner

*Primary Examiner* — Mohammad A Siddiqi
(74) *Attorney, Agent, or Firm* — BainwoodHuang

(57) ABSTRACT

An authentication technique involves obtaining, by processing circuitry, a set of suitability factors from a user device of a user. The authentication technique further involves performing, based on the set of suitability factors and by the processing circuitry, a selection operation which selects a set of suitable biometric methods to apply during authentication from available biometric methods which are available to the processing circuitry for use in authentication. The authentication technique further involves applying, after the set of suitable biometric methods is selected and by the processing circuitry, the set of suitable biometric methods during an authentication operation to determine whether the user is authentic. Accordingly, poorly suited biometric methods can be ruled out (i.e., made unavailable for use by authentication).

19 Claims, 5 Drawing Sheets

AUTHENTICATION INVOLVING SELECTION AMONG DIFFERENT BIOMETRIC METHODS DYNAMICALLY

BACKGROUND

Biometric authentication refers to identification of human beings by their individual characteristics or traits. Examples of biometric authentication include facial recognition, retina recognition, fingerprint recognition, handwriting recognition, and voice recognition.

During biometric authentication, current biometric measurements (e.g., current facial dimensions derived from a current facial image) are compared with expected biometric measurements (e.g., expected facial dimensions derived from one or more previously captured facial images). If the current biometric measurements match the expected biometric measurements, authentication is considered successful. However, if the current biometric measurements do not match the expected biometric measurements, authentication is considered unsuccessful.

SUMMARY

Computerized devices such as desktop computers, laptops, tablets, smart phones, smart televisions (TVs), game consoles, etc. are frequently provisioned with components that enable capture of biometric data. For example, desktop computers and smart phones often include cameras which enable the capture of facial images for facial recognition. As another example, tablets and smart phones often include touch screens to capture characteristic human gestures. Similarly, smart TVs and game consoles typically include infrared sensors and/or depth sensors to also capture characteristic human gestures, and so on.

Unfortunately, although a computerized device may be properly provisioned to capture certain types of biometric data, particular aspects of the current environment may reduce the strength of these types of biometric data for authentication purposes. For example, suppose that a human tries to speak into a microphone for voice recognition but the current environment is very noisy. In such a situation, although the human may be authentic (i.e., the actual legitimate person so that authentication should succeed), authentication may fail due to the noisy environment.

As another example, suppose that a human tries to capture a facial image for facial recognition, but the current environment is crowded (multiple faces) or the lighting is bad (too bright). Again, authentication may fail even if the human is authentic.

As yet another example, suppose that a human tries to capture handwriting for handwriting recognition, but the human is walking or riding in a vehicle on a bumpy road. In these situations, authentication may fail even if the human is authentic.

In the above-described conventional situations, authentication accuracy is negatively affected do to issues with the current environments. In particular, surrounding conditions such as noise level, crowdedness, light levels, movement, etc. can produce false negative authentication results. Accordingly, authentication for the legitimate person may be burdensome (i.e., the legitimate person needs to retry authentication) as well as frustrating (i.e., the legitimate person may be prevented from accessing an important but protected resource).

In contrast to the above-described conventional biometric authentication approaches in which authentication accuracy is negatively affected due to issues with current environments, improved techniques are directed to authentication which involves selecting among different biometric methods dynamically. For example, although an arsenal of biometric methods may be available for use, poorly suited biometric methods of the arsenal can effectively be ruled out (i.e., deemed unavailable for use). As another example, the best suited biometric method can be selected based on a variety of factors including device factors (i.e., what circuitry is available to capture biometric data), environmental factors (i.e., the states of ambient conditions), and even biometric method strength factors (i.e., weights defining particular security strengths of the available biometric methods). Such techniques improve the user's experience by lowering the false negative rate (i.e., users do not fail authentication easily due to unsuitable environment or device factors). Furthermore, such techniques are suitable for use in adaptive authentication (AA), new generation authentication, or any system that has authentication requirements.

One embodiment is directed to a method of authentication. The method includes obtaining, by processing circuitry, a set of suitability factors from a user device of a user. The method further includes performing, based on the set of suitability factors and by the processing circuitry, a selection operation which selects a set of suitable biometric methods to apply during authentication from available biometric methods which are available to the processing circuitry for use in authentication. The method further includes applying, after the set of suitable biometric methods is selected and by the processing circuitry, the set of suitable biometric methods during an authentication operation to determine whether the user is authentic.

In some arrangements, performing the selection operation which selects the set of suitable biometric methods includes: (i) based on the set of suitability factors obtained from the user device of the user, generating suitability scores which correspond to the available biometric methods, and (ii) choosing the set of suitable biometric methods from the available biometric methods based on the suitability scores. Such suitability scores are numerical measures of how effective the biometric methods will perform, i.e., are reflective of biometric authentication strength.

In some arrangements, a suitability score is generated for each available biometric method. Additionally, choosing the set of suitable biometric methods includes comparing the suitability score generated for each available biometric method to a predetermined threshold score. Furthermore, choosing includes (i) adding that available biometric method to the set of suitable biometric methods when the suitability score generated for that available biometric method exceeds the predetermined threshold score, and (ii) eliminating that available biometric method from the set of suitable biometric methods when the suitability score generated for that available biometric method is less than the predetermined threshold score.

In some arrangements, applying the set of suitable biometric methods during the authentication operation includes receiving a set of biometric authentication factors from the user device of the user, the set of biometric authentication factors being separate from the set of suitability factors. In these arrangements, applying further includes performing an authentication operation to authenticate the user based on the set of biometric authentication factors, authentication being successful when current user data derived from the set of biometric authentication factors matches expected user data within a predefined set of tolerances, and authentication being unsuccessful when the current user data derived from the set of biometric authentication factors does not match the expected user data within the predefined set of tolerances.

In some arrangements, applying the set of suitable biometric methods during the authentication operation includes applying all of the biometric methods of the set of suitable biometric methods during the authentication operation. Along these lines, overall authentication is stronger due to application of multiple biometric methods.

In some arrangements, applying the set of suitable biometric methods during the authentication operation includes selecting a biometric method having a highest suitability score from the set of suitable biometric methods, and applying only the selected biometric method during the authentication operation. In these arrangements, the best suited biometric method is applied (perhaps in combination with other authentication operations such as part of AA or multi-factor authentication).

In some arrangements, applying the set of suitable biometric methods during the authentication operation includes ranking the suitable biometric methods based on suitability score. In these arrangements, applying the set of suitable biometric methods during the authentication operation further includes applying only the top N highest ranked biometric methods of the set of suitable biometric methods during the authentication operation, N being a positive integer.

In some arrangements, generating the suitability scores which correspond to the available biometric methods includes generating, for each available biometric method, a respective suitability score based on (i) the set of suitability factors and (ii) a biometric method strength factor which defines a particular security strength for that available biometric method relative to other security strengths for other available biometric methods. Accordingly, a stronger form of biometric authentication such as fingerprint authentication may be selected over a weaker form of biometric authentication such as handwriting authentication.

In some arrangements, obtaining the set of suitability factors from the user device of the user includes acquiring a set of device factors from the user device of the user. The device factors indicate whether the user device is equipped with circuitry to obtain particular types of biometric authentication factors from the user.

In some arrangements, obtaining the set of suitability factors from the user device of the user further includes acquiring a set of environmental factors from the user device of the user. The environmental factors indicate whether the user device currently resides in an environment which is suitable for obtaining the particular types of biometric authentication factors from the user.

In some arrangements, acquiring the set of device factors from the user device includes concurrently receiving (i) a camera factor indicating whether the user device is equipped with a camera to perform facial recognition, (ii) a microphone factor indicating whether the user device is equipped with a microphone to perform voice recognition, (iii) a movement sensor factor indicating whether the user device is equipped with a movement sensor, and (iv) a user gesture factor indicating whether the user device is equipped with a user gesture sensor to perform user gesture analysis. Alternatively, acquiring the set of device factors includes receiving at least one of these device factors.

In some arrangements, acquiring the set of environmental factors from the user device includes concurrently receiving (i) a lighting measurement to determine whether the camera is currently in an environment which is suitable to perform facial recognition, (ii) a noise measurement to determine whether the microphone is currently in an environment which is suitable to perform voice recognition, and (iii) a movement measurement to determine whether the user device is currently in an environment which is suitable to perform user gesture analysis using the user gesture sensor. Alternatively, acquiring the set of environmental factors includes receiving at least one of these environmental factors.

It should be understood that, in the cloud context, the electronic circuitry which performs the improved techniques is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in authentication by selecting among different available biometric methods dynamically.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to authentication which involves dynamically choosing among different available biometric methods. For example, poorly suited biometric methods can be ruled out effectively (i.e., deemed unavailable for use by authentication). As another example, the best suited biometric method can be selected based on a variety of factors including device factors (i.e., what circuitry is available to capture biometric data), environmental factors (i.e., the states of ambient conditions), and even biometric method strength factors (i.e., weights defining particular security strengths of the available biometric methods). Such techniques provide a better user experience by lowering the rate of false negatives (i.e., the authentic user does not fail authentication easily due to unsuitable environment or device factors). Additionally, such techniques are suitable for use in adaptive authentication (AA), new generation authentication, or any system that has authentication requirements.

Figure 1:
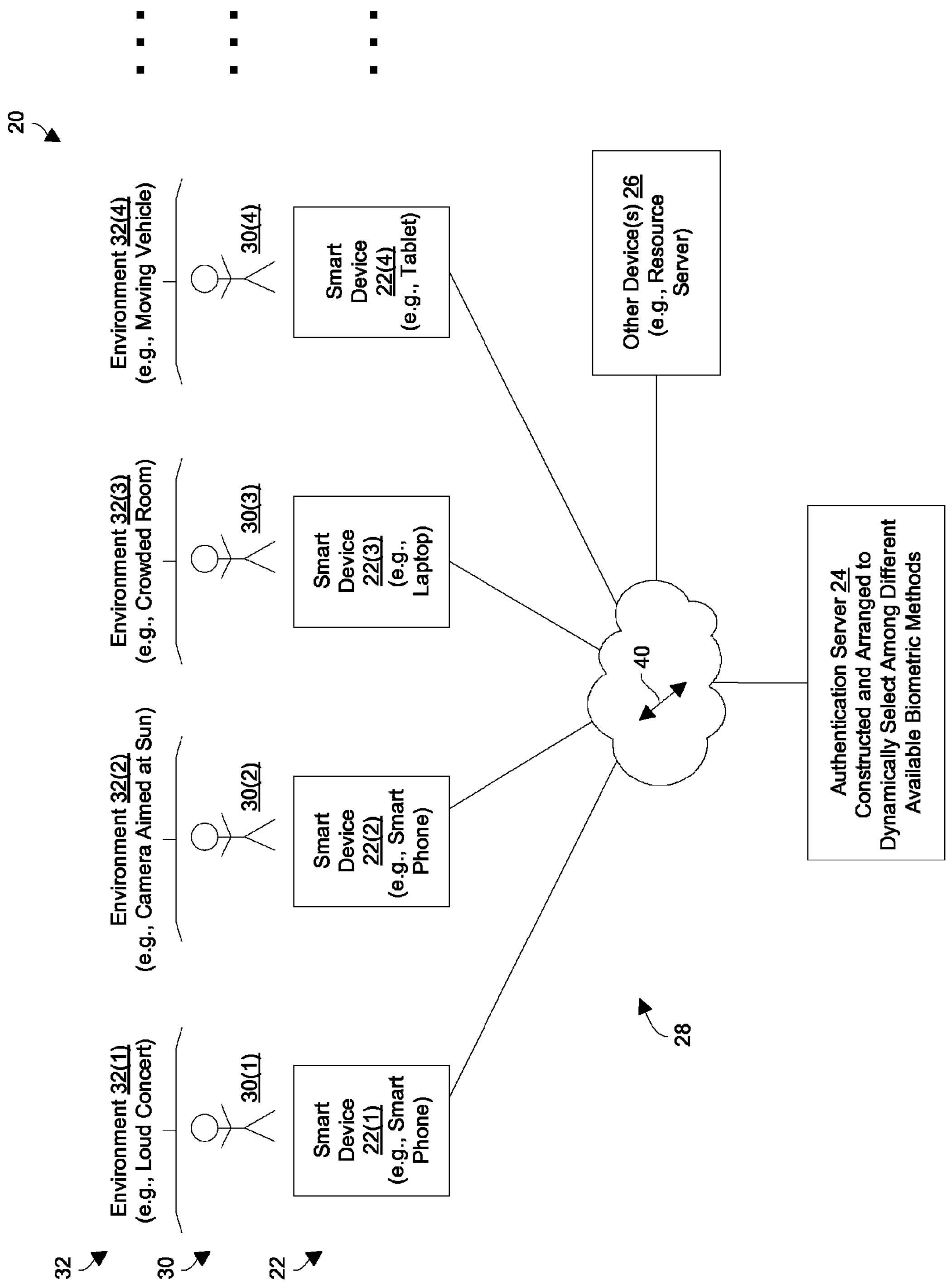
FIG. 1 is a block diagram of an electronic network which is suitable for use in authentication involving dynamic selection among available biometric methods.

FIG. 1 shows an electronic network 20 which uses authentication involving selection among available biometric methods dynamically. The electronic network 20 includes smart devices 22(1), 22(2), 22(3), 22(4), . . . (collectively, smart devices 22), an authentication server 24, other device(s) 26, and a communications medium 28.

Each smart device 22 is controlled by a respective user 30, and resides in a respective environment 32. By way of example only, the smart device 22(1) may be a smart phone controlled by a user 30(1), and may currently reside in a loud concert environment 32(1). Similarly, the smart device 22(2) may be another smart phone controlled by a user 30(2), and may currently reside in an extremely sunny environment 32(2). Additionally, the smart device 22(3) may be a laptop controlled by a user 30(3), and may currently reside in a crowded room environment 32(3). Furthermore, the smart device 22(4) may be a tablet controlled by a user 30(4), and may currently reside in a moving vehicle environment 32(4), and so on.

The smart devices 22 are constructed and arranged to enable their respective users 30 to perform useful work (e.g., access files, use email, perform online transactions, play games, communicate with other users 30, etc.). During such activity, the users 30 may need to authenticate with the authentication server 24. As will be explained in further detail shortly, such authentication involves dynamic selection among different available biometric methods.

The authentication server 24 is constructed and arranged to authenticate the users 30. For example, the users 30 may need to successfully authenticate before obtaining access to protected resources on their respective smart devices 22, or on other external servers (e.g., see the other devices 26).

The other devices 26 represent additional apparatus on the electronic network 20 which may are may not be involved in authentication. For example, the other devices 26 may include resource servers which access the authentication server 24 to successfully authenticate users 30 prior to allowing the users 30 to access protected resources such as sensitive files and other content, email, VPN access, transactions, games, etc. The other devices 26 may also represent other entities on the Internet (e.g., hackers, malicious devices, etc.).

The communications medium 28 is constructed and arranged to connect the various components of the electronic network 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the authentication server 24 receives authentication requests and performs authentication operations to authenticate the users 30. Such requests may be sent by the smart devices 22 directly to the authentication server 24 (e.g., the users 30 may be trying to access protected resources available locally on their smart devices 22). Such requests also may be sent from the other devices 26 (e.g., the users 30 may be trying to access protected resources available on protected resource servers using their smart devices 22, and the protected resource servers then communicate with the authentication server 24 to authenticate the users 30).

During such authentication, the authentication server 24 is able to choose among different biometric methods which are available for use. Such selection is based on a variety of factors including (i) device factors (i.e., what capabilities are available on the smart devices 22 of the users 30), (ii) environmental factors (i.e., what aspects of the current environments 32 affect suitability the available biometric methods), and (iii) biometric method strength (i.e., certain biometric methods are more accurate), perhaps among other factors. In particular, the authentication server 24 rules out (i.e., eliminates) unsuitable biometric methods that would not work, be ineffective or provide poor results based on these factors. Accordingly, authentication results from the authentication server 24 are more reliable, and the user experience is improved via a lower false negative rate. Further details will now be provided with reference to FIG. 2.

Figure 2:
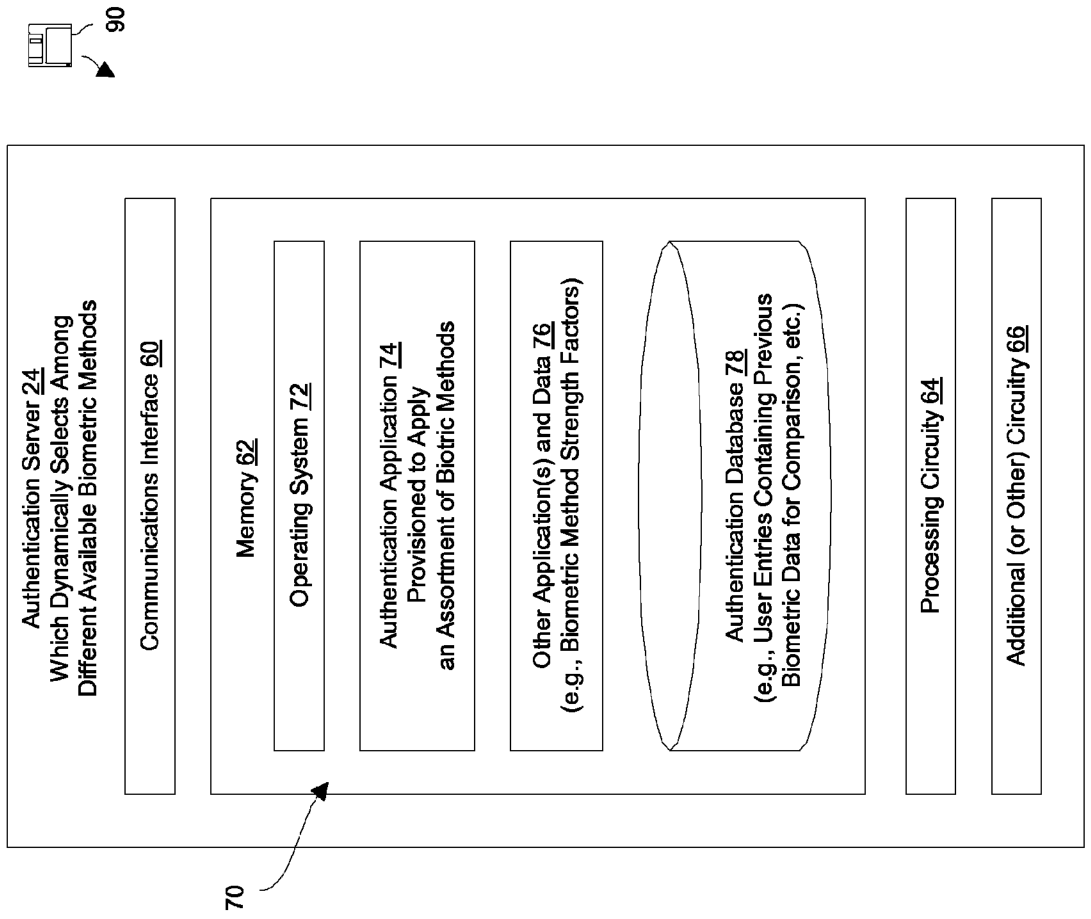
FIG. 2 is a block diagram of an electronic apparatus of the electronic network of FIG. 1.

FIG. 2 shows particular details of the authentication server 24 (also see FIG. 1). The authentication server 24 includes a communications interface 60, memory 62, processing circuitry 64, and additional (or other) circuitry 66.

The communications interface 60 is constructed and arranged to connect the authentication server 24 to the communications medium 28 to enable communications with other components of the electronic network 20 (FIG. 1). Such communications may be IP-based, cellular-based, cable-based, combinations thereof, and so on. Accordingly, the communications interface 60 enables the authentication server 24 to communicate with the smart devices 22 and other devices 26 to perform user authentication.

The memory 62 is intended to represent both volatile storage (e.g., DRAM, SRAM, etc.) and non-volatile storage (e.g., flash memory, etc.). The memory 62 stores a variety of software constructs 70 including an operating system 72 to manage resources of the authentication server 24, a specialized authentication application 74 to perform authentication involving selection among different biometric methods dynamically, other applications and data 76 (e.g., other authentication mechanisms, utilities, parameters and settings, etc.), and an authentication database 78 (e.g., user profiles containing user data for use during authentication).

The processing circuitry 64 is constructed and arranged to operate in accordance with the various software constructs 70 stored in the memory 62. Such circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the authentication server 24. The computer program product 90 has a non-transitory (or non-volatile) computer readable medium which stores a set of instructions which controls one or more operations of the authentication server 24. Examples of suitable computer readable storage media include tangible articles of manufacture and apparatus which store instructions in a non-volatile manner such as CD-ROM, flash memory, disk memory, tape memory, and the like.

The additional circuitry 66 represents other portions of the authentication server 24. For example, the authentication server 24 may include a user interface to enable a user such as an administrator to enter input and receive output (user I/O) to operate the authentication server 24.

During operation, the processing circuitry 64 runs the authentication application 74 to form specialized control circuitry which performs authentication operations to authenticate the users 30 of the smart devices 22. Such authentication may involve direct communication with the smart devices 22, or indirect communication via other devices such as resource servers (see other devices 26 in FIG. 1).

In particular, upon receipt of an authentication request, the control circuitry (i.e., the processing circuitry 64 executing the authentication application 74) obtains a set of suitability factors from a smart device 22 of a user 30. The set of suitability factors include, among other things, device factors, environmental factors, and biometric method strength factors. Such factors may be acquired by the authentication server 24 during a handshaking exchange with the smart device 22 (directly or perhaps through another device 26). Alternatively, such factors may have been included with the authentication request.

The device factors identify the capabilities of the smart device 22 of the user 30 and thus which of the various available biometric methods provisioned in the authentication server 24 can be applied to authenticate the user 30 of the smart device 22. For example, if the smart device 22 is a smart phone or a tablet, the device factors may indicate that the smart device 22 has a camera, a microphone, a movement sensor such as an accelerometer and/or a GPS circuit, a touch screen, other types of user input circuitry, and so on. Accordingly, biometric methods such as facial recognition (via the camera), voice recognition (via the microphone), handwriting analysis (via the touch screen) can be used by the authentication server 24.

However, if the smart device 22 is a laptop, the smart device 22 may not have any movement sensor or a touch screen, but instead be equipped with a keyboard and a touch pad. Accordingly, handwriting analysis cannot be used (i.e., no touch screen), but other user gesture analysis can be performed such as typing analysis (via the keyboard) and pointing gesture analysis (via the touch pad).

Additionally, if the smart device 22 is a smart TV, the smart device 22 may have access to a webcam/microphone apparatus and game controller. Here, facial recognition, voice recognition, and user gesture analysis can be used.

Furthermore, if the smart device 22 is a personal computer, the smart device 22 may be equipped with a webcam and microphone, a keyboard and mouse, and so on. Accordingly, facial recognition, voice recognition, user gesture analysis, etc. can be used. Other smart device configurations and their corresponding device factors are suitable for use as well.

The environmental factors identify aspects of the environment 32 in which the smart device 22 currently resides. To obtain the environmental factors, the authentication server 24 may direct the smart device 22 to activate particular capabilities for a short duration. For example, each camera of the smart device 22 may briefly activate to obtain a lighting measurement. Additionally, a microphone of the smart device 22 may briefly activate to obtain a sound level measurement. Furthermore, a movement sensor of the smart device 22 may briefly activate to obtain a movement measurement, and so on. It should be understood that it is not necessary to convey the full content captured by the smart device 22 (e.g., an image, user audio, a geolocation, etc.), but just a raw measurement from an environmental perspective (e.g., a brightness level, a face count, a noise level, an indication of significant movement, etc.).

The biometric method strength factors provide weights identifying accuracy (or strength) of each available biometric method compared to the other available biometric methods. That is, such weights correlate to biometric method accuracy (e.g., the higher the weight, the more preferable the biometric method).

Along these lines, suppose that a smart phone has a fingerprint scanner for fingerprint recognition as well as a camera for facial recognition. In this situation, if fingerprint recognition has been proven to be a stronger form of authentication relative to facial recognition, the fingerprint recognition biometric method can be given a higher weight than the facial recognition biometric method.

Similarly, suppose that a user workstation has a webcam for facial recognition, a microphone for voice recognition, a keyboard for user gesture analysis (typing rate), and a mouse for user gesture analysis (mouse movements). Here, the stronger facial recognition and voice recognition biometric methods may be weighted higher than either of the weaker user gesture biometric methods, and so on.

With the suitability factors now available to the control circuitry of the authentication server 24, the control circuitry performs a selection operation which selects, from the different available biometric methods which are available to the control circuitry for use in authentication, a set of suitable biometric methods to apply during user authentication. In particular, the control circuitry (i) generates a suitability score for each available biometric method: facial recognition, voice recognition, handwriting analysis, etc., and (ii) compares the suitability score to a predefined threshold score. If the suitability score for that biometric method is at least as high as the predefined threshold score, the control circuitry deems that biometric method to be selected as a suitable biometric method, i.e., the control circuitry includes that biometric method in the set of suitable biometric methods. However, if the suitability score for that biometric method is under the predefined threshold score, the control circuitry deems that biometric method to be unsuitable and does not include that biometric method in the set of suitable biometric methods, i.e., that biometric method is effectively ruled out or eliminated.

As a result, the selection operation generates a set of suitable biometric methods which the authentication server 24 can use for authentication of the user 30 of the smart device 22. At this point, the control circuitry of the authentication server 24 performs an authentication operation which applies at least one of the biometric methods from the set of suitable biometric methods to determine whether the user is authentic. In particular, the control circuitry obtains biometric authentication factors from the user 30 via the smart device 22 and derives current user data from the biometric authentication factors. If the current user data matches expected user data (e.g., see the authentication database 78 in FIG. 2) within a predefined set of tolerances (e.g., 3% accuracy, 5% accuracy, etc. depending on the particular biometric method(s) being applied), authentication is successful. However, if the current user data does not match the expected user data within the predefined set of tolerances, authentication is unsuccessful.

It should be understood that, in some arrangements, the authentication server 24 applies all of the biometric methods in the set of suitable biometric methods. In these arrangements, the accuracy of biometric authentication is strongest due to application of multiple biometric methods.

In other arrangements, the authentication server 24 applies the biometric method of the set of suitable biometric methods having the highest suitability score. Such an arrangement may be appropriate in situations in which the users 30 should not be overburdened during biometric collection (e.g., it could be too burdensome to ask a user 30 to concurrently provide a facial image, a voice sample, a fingerprint scan, and a handwriting sample all in the same authentication attempt).

Other arrangements are suitable for use as well such as ranking the suitable biometric methods based on suitability score, and applying only the top N highest ranked biometric methods of the set of suitable biometric methods during the authentication operation, N being a positive integer. For example, if the user 30 is facing a tablet, the tablet may prompt the user 30 for a voice sample but nevertheless capture the user's face as well and perform voice and facial recognition concurrently. Determination of which biometric methods from the set of suitable biometric methods are to be used (i.e., which of the above-described arrangements should be used) can be dictated by a predefined policy. Further details will now be provided with reference to FIG. 3.

Figure 3:
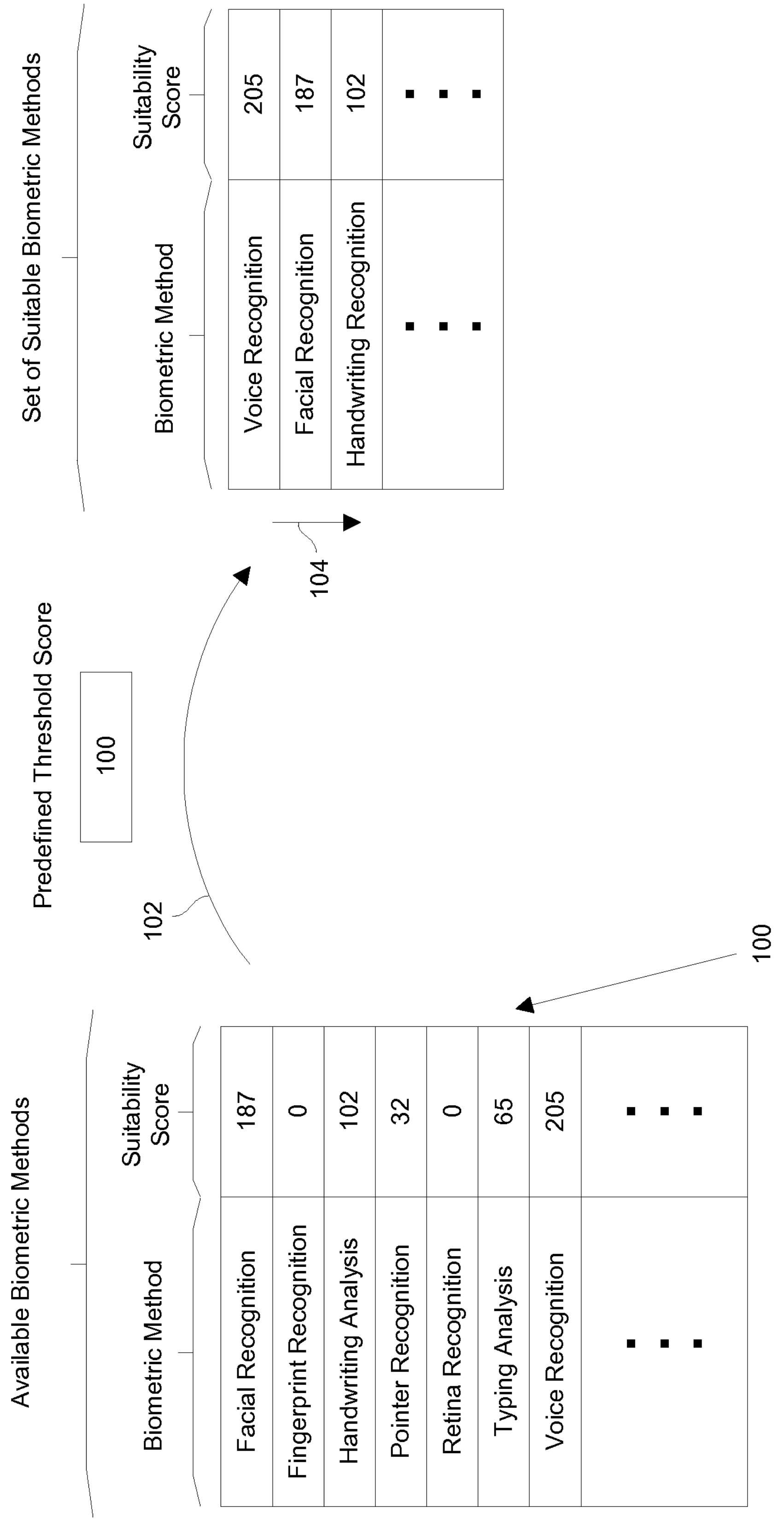
FIG. 3 is a block diagram illustrating particular suitability score details of the electronic apparatus of FIG. 2.

FIG. 3 shows how the control circuitry of the authentication server 24 provides the set of suitable biometric methods from the available biometric methods which are initially available to the control circuitry for use in authentication. As mentioned earlier, such operation involves, for each authentication attempt by a user 30 using a smart device 22 (also see FIG. 1), generation of suitability scores for the various available biometric methods based on a collected set of suitability factors. The data which is gathered, generated and handled during such operation is represented by the additional applications and data 76 in FIG. 2.

As shown in FIG. 3, the control circuitry of the authentication server 24 generates a suitability score based on the earlier described suitability factors (see arrow 100 in FIG. 3). By way of example, facial recognition, handwriting analysis, and voice recognition have relatively high suitability scores perhaps due to the availability of certain capabilities on the smart device 22 of the user 30, optimal environmental conditions, and strength (based on weights) of these particular biometric methods. In contrast, fingerprint recognition, pointer recognition, retina recognition, and typing analysis have relatively low suitability scores in this example. These lower suitability scores may be due to the lack of capabilities on the smart device 22 of the user 30, poor environmental conditions, and/or the weakness of these particular biometric methods.

As further shown in FIG. 3, the suitability scores of the biometric methods are compared to a predefined threshold score (see arrow 102 in FIG. 3). The predefined threshold score may be a normalized metric (e.g., the value "100") or tunable (e.g., over time to achieve the most accurate or satisfactory results). Such a setting is represented by the additional applications and data 76 in FIG. 2. During such comparison, only biometric methods with suitability scores that exceed the predefined threshold score are put in the set of suitable biometric methods. That is, biometric methods with suitability scores that are less than the predefined threshold score are ruled out.

As the biometric methods are added to the set of suitable biometric methods (or after all of the biometric methods are added to the set), the biometric methods can be sorted based on suitability score (see arrow 104 in FIG. 3). As a result, the control circuitry is now able to select which biometric method (or biometric methods) to apply during authentication of the user 30 of the smart device 22. In this example, if the control circuitry is configured to apply the biometric method with the highest suitability score, the control circuitry applies voice recognition to authenticate the user 30. Further details will now be provided with reference to FIG. 4.

Figure 4:
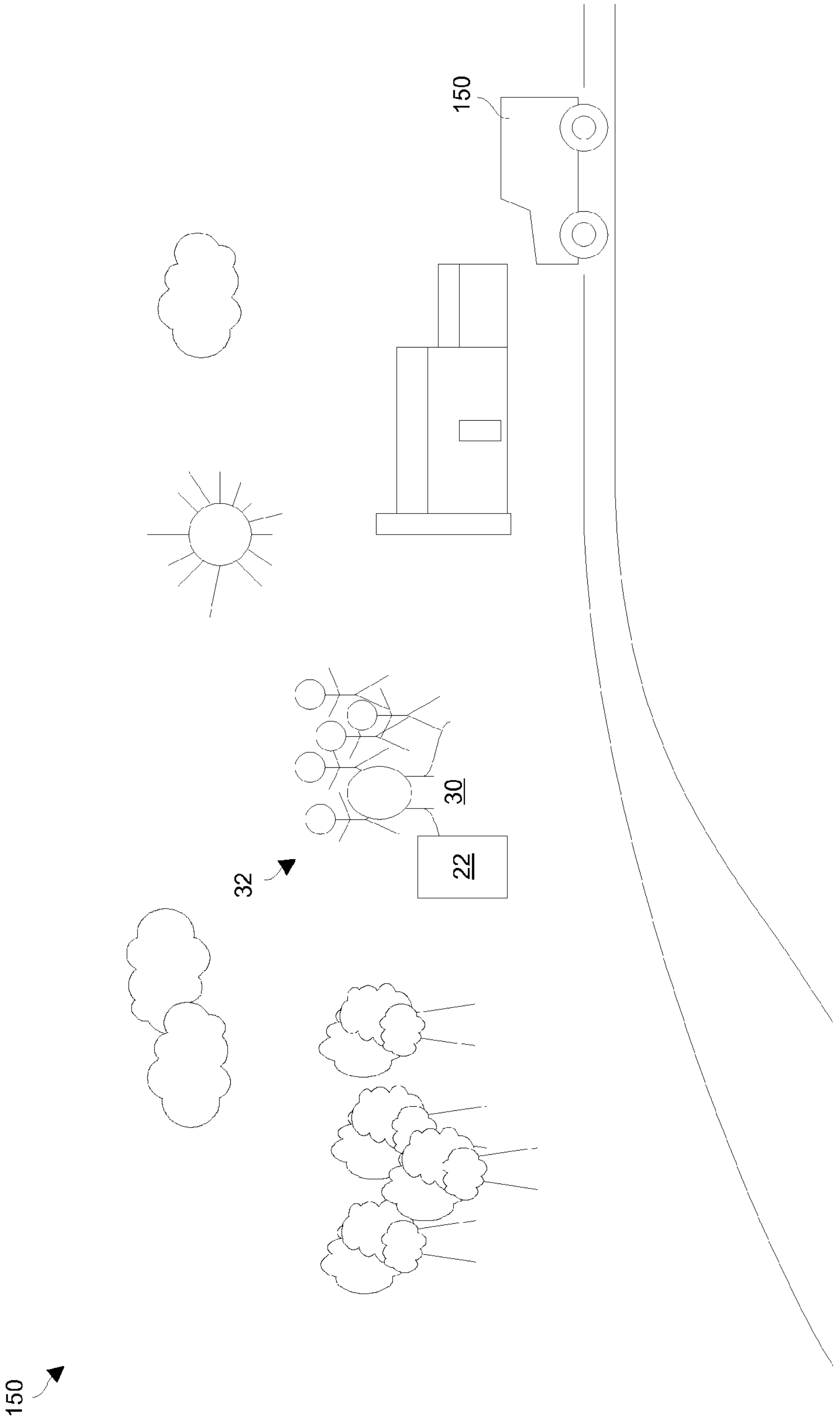
FIG. 4 is a block diagram of an example in which a set of biometric methods can be selected among available biometric methods.

FIG. 4 shows a user 30 in possession of a smart device 22 in a general setting 150. Depending on the particular conditions of the immediate surrounding environment 32 and how the smart device 22 is situated within that environment 32, the authentication server 24 may select or rule out particular biometric methods for use in authentication. It should be understood that the environmental conditions may be static (i.e., consistent hour to hour, day to day, etc.). Alternatively, such aspects may change over time (e.g., to do mobility of the smart device 22, camera orientation, time of day, number of people in the vicinity, and so on). Regardless of such variability or lack thereof, the environmental conditions affect the accuracy of the various available biometric methods.

For example, suppose that the smart device 22 is a smart phone or a tablet which is equipped with a variety of biometric sensing capabilities such as a camera, a microphone, a touch pad, an accelerometer, and so on. If the user 30 uses the smart device 22 to authenticate and strong background noise is detected using the microphone (e.g., due to loud music, a crowd in the vicinity, street noise, etc.), then the suitability score for voice recognition will indicate that voice recognition is less preferred (also see the smart device 22(1) in FIG. 1 and see FIG. 3).

However, suppose that the smart device 22 is a smart phone and the user 30 is currently in a strong over-illuminated environment (e.g., facing the sun) but with low background noise (see the smart device 22(2) in FIG. 1 and see FIG. 3). In this situation, the suitability scores may indicate that voice recognition is preferred over facial recognition.

As another example, suppose that the smart device 22 is a laptop or a personal computer which is equipped with a webcam and a microphone. However, further suppose that the suitability factors indicate that there is than one person is detected in the webcam image (e.g., see the smart device 22(3) in FIG. 1). In this situation, face recognition may be less preferred over another type of biometric method such as user gesture analysis (e.g., evaluation of typing rate, mouse movement habits, etc.).

As yet another example, suppose that all environmental conditions are generally optimal but that the user 30 has disabled the camera of the smart device 22. In this situation, the suitability score for facial recognition will still be low (e.g., the value "0") to prevent the authentication server 24 from using facial recognition as the biometric method.

As a further example, suppose that the user 30 and the smart device 22 reside in a moving vehicle 152 (FIG. 4), and that the smart device 22 is a tablet with a touch screen (see the smart device 22(4) in FIG. 1). In this situation, movement can be detected by measurements from an accelerometer of the smart device 22. Movement may also be detected by output from a GPS circuit of the smart device 22 if available. Here, the authentication server 24 may provide relatively low suitability scores for certain biometric methods such as handwriting analysis, or typing analysis due to the sensing of such movement. Further details will now be provided with reference to FIG. 5.

Figure 5:
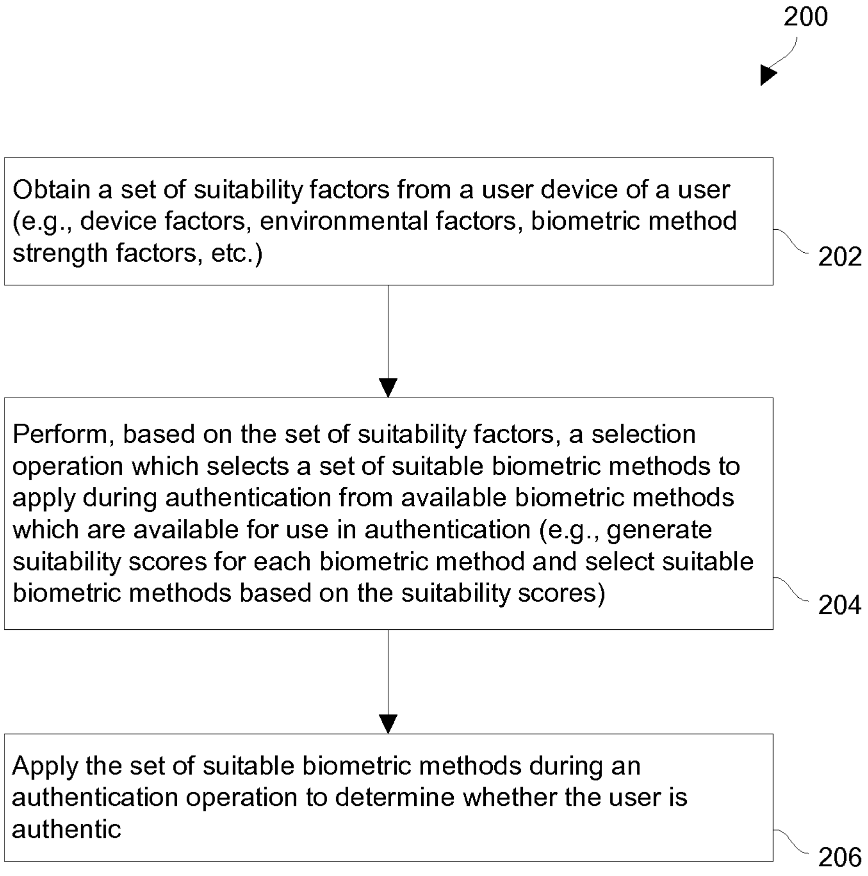
FIG. 5 is a flowchart of a procedure which is performed by the electronic apparatus of FIG. 2.

FIG. 5 is a flowchart of a procedure 200 which is performed by the authentication server 24 to process a request to authenticate a user 30 of a smart device 22 (also see FIG. 2). In step 202, the authentication server 24 obtain a set of suitability factors from the smart device 22 of the user 30. The set of suitability factors may be received as part of an authentication request, or obtained via an exchange with the smart device 22 in response to an authentication request. Recall that the set of suitability factors can include device factors (i.e., what smart device capabilities are available to capture biometric data), environment factors (i.e., the states of surrounding conditions), and biometric method strength factors (e.g., weights defining particular security strengths of the available biometric methods).

In step 204, the authentication server 24 performs, based on the set of suitability factors, a selection operation which selects a set of suitable biometric methods to apply during authentication from available biometric methods which are available for use in authentication. Such operation involves generation and evaluation of suitability scores for the biometric methods to rule out certain available biometric methods (also see FIG. 3).

In step 206, after the set of suitable biometric methods is selected, the authentication server 24 applies the set of suitable biometric methods during an authentication operation to determine whether the user 30 is authentic. In particular, one or more of the suitable biometric methods (e.g., based on policy) is applied during authentication to determine whether the user 30 of the smart device 22 is legitimate. Along these lines, current user data is compared to expected user data (also see the authentication database 78 in FIG. 2). It should be understood that such biometric authentication can be used as a standalone authentication mechanism, or combined with other forms of authentication (e.g., adaptive authentication, multi-factor authentication, and so on).

As described above, improved techniques are directed to authentication which involves selecting among different biometric methods dynamically. For example, although an arsenal of biometric methods may be available for use, poorly suited biometric methods of the arsenal can effectively be ruled out (i.e., deemed unavailable for use by authentication). As another example, the best suited biometric method can be selected based on a variety of factors including device factors, environmental factors, and even biometric method strength factors. Such techniques improve the user's experience by lowering the false negative rate (i.e., users do not fail authentication easily due to unsuitable environment or device factors). Furthermore, such techniques are suitable for use in adaptive authentication (AA), new generation authentication, or any system that has authentication requirements.

While various embodiments of the present disclosure have been particularly shown and described, it will be understood by those skilled in the art that various changes in form and details may be made therein without departing from the spirit and scope of the present disclosure as defined by the appended claims.

In particular, it should be understood that various components of the electronic network 20 are capable of being implemented in or "moved to" the cloud, i.e., to remote computer resources distributed over a network. For example, the resources forming the authentication server 24 can be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on. Such modifications and enhancements are intended to belong to various embodiments of the disclosure.

What is claimed is:

1. A method of authentication, comprising:

obtaining, by processing circuitry, a set of suitability factors from a user device of a user;

performing, based on the set of suitability factors and by the processing circuitry, a score-based selection operation which selects a set of suitable biometric methods to apply during authentication from available biometric methods which are available to the processing circuitry for use in authentication; and after the set of suitable biometric methods is selected, applying, by the processing circuitry, the set of suitable biometric methods during an authentication operation to determine whether the user is authentic;

wherein performing the score-based selection operation includes:

obtaining a set of sensor measurements from a set of biometric sensors of the user device, and selecting a particular biometric method to apply during a subsequently performed biometric authentication operation based on the set of sensor measurements from the set of biometric sensors; and wherein selecting the particular biometric method to apply includes:

for the biometric methods which are available to the processing circuitry, (i) generating numerical suitability scores, each suitability score being a numerical measure of effectiveness of a respective biometric method, and (ii) selecting the particular biometric method from the biometric methods which are available to the processing circuitry based on the numerical suitability scores, the particular biometric method being used during the subsequently performed biometric authentication operation.

2. A method as in claim 1 wherein selecting the particular biometric method from the biometric methods which are available to the processing circuitry includes:

comparing a respective numerical suitability score generated for each available biometric method to a predetermined threshold score, and (i) adding that available biometric method to the set of suitable biometric methods when the suitability score generated for that available biometric method exceeds the predetermined threshold score, and (ii) eliminating that available biometric method from the set of suitable biometric methods when the suitability score generated for that available biometric method is less than the predetermined threshold score.

3. A method as in claim 2 wherein applying the set of suitable biometric methods during the authentication operation includes:

receiving a set of biometric authentication factors from the user device of the user, the set of biometric authentication factors being separate from the set of suitability factors, and performing an authentication operation to authenticate the user based on the set of biometric authentication factors, authentication being successful when current user data derived from the set of biometric authentication factors matches expected user data within a predefined set of tolerances, and authentication being unsuccessful when the current user data derived from the set of biometric authentication factors does not match the expected user data within the predefined set of tolerances.

4. A method as in claim 2 wherein the set of suitable biometric methods includes the particular biometric method; and wherein applying the set of suitable biometric methods during the authentication operation includes:

applying all of the biometric methods of the set of suitable biometric methods during the authentication operation.

5. A method as in claim 2 wherein the set of suitable biometric methods includes the particular biometric method; and wherein applying the set of suitable biometric methods during the authentication operation includes:

selecting, as a biometric method having a highest suitability score from the set of suitable biometric methods, the particular biometric method, and applying only the particular biometric method during the authentication operation.

6. A method as in claim 2 wherein the set of suitable biometric methods includes the particular biometric method;

and wherein applying the set of suitable biometric methods during the authentication operation includes:

ranking the suitable biometric methods based on suitability score, and applying only the top N highest ranked biometric methods of the set of suitable biometric methods during the authentication operation, the top N highest ranked biometric methods including the particular biometric method, N being a positive integer.

7. A method as in claim 2 wherein generating the numerical suitability scores which correspond to the available biometric methods includes:

generating, for each available biometric method, a respective suitability score based on (i) the set of suitability factors and (ii) a biometric method strength factor which defines a particular security strength for that available biometric method relative to other security strengths for other available biometric methods.

8. A method as in claim 2 wherein obtaining the set of suitability factors from the user device of the user includes:

acquiring a set of device factors from the user device of the user, the device factors indicating whether the user device is equipped with circuitry to obtain particular types of biometric authentication factors from the user.

9. A method as in claim 8 wherein obtaining the set of suitability factors from the user device of the user further includes:

acquiring a set of environmental factors from the user device of the user, the environmental factors indicating whether the user device currently resides in an environment which is suitable for obtaining the particular types of biometric authentication factors from the user.

10. A method as in claim 9 wherein acquiring the set of device factors from the user device includes:

receiving a camera factor indicating whether the user device is equipped with a camera to perform facial recognition.

11. A method as in claim 10 wherein acquiring the set of environmental factors includes:

receiving a lighting measurement to determine whether the environment is suitable to perform facial recognition.

12. A method as in claim 10 wherein acquiring the set of environmental factors includes:

receiving an image from the camera and deriving a numerical face count from the image to determine whether the environment is suitable to perform facial recognition.

13. A method as in claim 9 wherein acquiring the set of device factors from the user device includes receiving a microphone factor indicating whether the user device is equipped with a microphone to perform voice recognition; and wherein acquiring the set of environmental factors includes receiving a noise measurement to determine whether the environment is suitable to perform voice recognition.

14. A method as in claim 9 wherein acquiring the set of device factors from the user device includes receiving (i) a movement sensor factor indicating whether the user device is equipped with a movement sensor to perform movement sensing and (ii) a user gesture sensor factor indicating whether the user device is equipped with a user gesture sensor to detect user gestures; and wherein acquiring the set of environmental factors includes receiving a movement measurement to determine whether the environment is suitable to perform user gesture analysis using the user gesture sensor.

15. A method as in claim 9 wherein acquiring the set of device factors from the user device includes receiving a fingerprint sensor factor indicating whether the user device is equipped with a fingerprint sensor to perform fingerprint recognition.

16. A method as in claim 9 wherein acquiring the set of device factors from the user device includes:

concurrently receiving (i) a camera factor indicating whether the user device is equipped with a camera to perform facial recognition, (ii) a microphone factor indicating whether the user device is equipped with a microphone to perform voice recognition, (iii) a movement sensor factor indicating whether the user device is equipped with a movement sensor, and (iv) a user gesture factor indicating whether the user device is equipped with a user gesture sensor to perform user gesture analysis.

17. A method as in claim 16 wherein acquiring the set of environmental factors from the user device includes:

concurrently receiving (i) a lighting measurement to determine whether the camera is currently in an environment which is suitable to perform facial recognition, (ii) a noise measurement to determine whether the microphone is currently in an environment which is suitable to perform voice recognition, and (iii) a movement measurement to determine whether the user device is currently in an environment which is suitable to perform user gesture analysis using the user gesture sensor.

18. An electronic apparatus, comprising:

a communications interface;

memory; and control circuitry coupled to the communications interface and the memory, the memory storing instructions which, when carried out by the control circuitry, cause the control circuitry to:

obtain a set of suitability factors from a user device of a user through the communications interface, based on the set of suitability factors, perform a score-based selection operation which selects a set of suitable biometric methods to apply during authentication from available biometric methods which are available to the processing circuitry for use in authentication, and after the set of suitable biometric methods is selected, apply the set of suitable biometric methods during an authentication operation to determine whether the user is authentic;

wherein the control circuitry, when performing the score-based selection operation, is constructed and arranged to:

obtain a set of sensor measurements from a set of biometric sensors of the user device, and select a particular biometric method to apply during a subsequently performed biometric authentication operation based on the set of sensor measurements from the set of biometric sensors; and wherein the control circuitry, when selecting the particular biometric method to apply, is constructed and arranged to:

for the biometric methods which are available to the processing circuitry, (i) generate numerical suitability scores, each suitability score being a numerical measure of effectiveness of a respective biometric method, and (ii) select the particular biometric method from the biometric methods which are available to the processing circuitry based on the numerical suitability scores, the particular biometric method being used during the subsequently performed biometric authentication operation.

19. A computer program product having a non-transitory computer readable medium which stores a set of instructions to authenticate a user, the set of instructions, when carried out by computerized circuitry, causing the computerized circuitry to perform a method of:

obtaining, by the computerized circuitry, a set of suitability factors from a user device of the user;

performing, based on the set of suitability factors and by the computerized circuitry, a score-based selection operation which selects a set of suitable biometric methods to apply during authentication from available biometric methods which are available to the computerized circuitry for use in authentication; and after the set of suitable biometric methods is selected, applying, by the computerized circuitry, the set of suitable biometric methods during an authentication operation to determine whether the user is authentic;

wherein performing the score-based selection operation includes:

obtaining a set of sensor measurements from a set of biometric sensors of the user device, and selecting a particular biometric method to apply during a subsequently performed biometric authentication operation based on the set of sensor measurements from the set of biometric sensors; and wherein selecting the particular biometric method to apply includes:

for the biometric methods which are available to the computerized circuitry, (i) generating numerical suitability scores, each suitability score being a numerical measure of effectiveness of a respective biometric method, and (ii) selecting the particular biometric method from the biometric methods which are available to the computerized circuitry based on the numerical suitability scores, the particular biometric method being used during the subsequently performed biometric authentication operation.

* * * * *